Oct. 16, 1956
F. L. BROWN ET AL
2,766,768
FLUID FLOW CONTROL VALVE
Filed Nov. 17, 1952
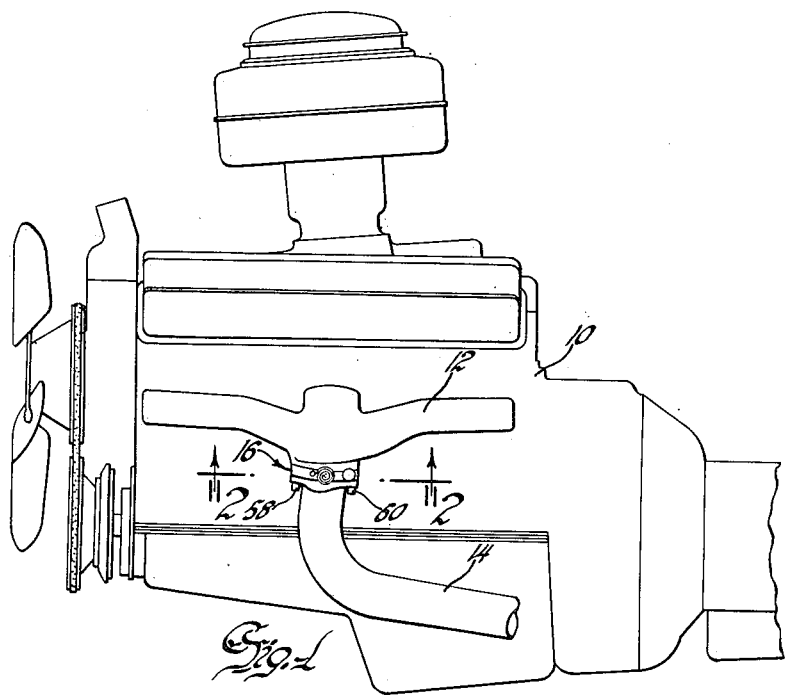
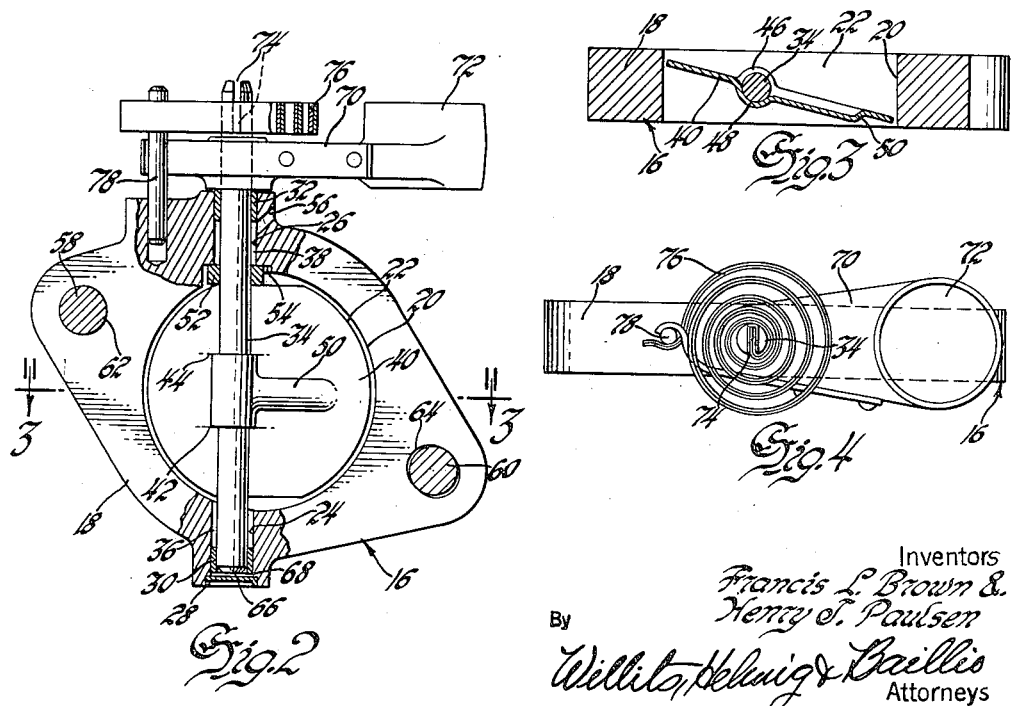
Inventors
Francis L. Brown &
Henry J. Paulsen
By Willits, Helmig & Baillie
Attorneys

United States Patent Office 2,766,768
Patented Oct. 16, 1956

2,766,768

FLUID FLOW CONTROL VALVE

Francis L. Brown, Inkster, and Henry J. Paulsen, Dearborn, Mich., assignors to General Motors Corporation, Detroit, Mich., a corporation of Delaware Application November 17, 1952, Serial No. 320,846

3 Claims. (Cl. 137—312)

This invention relates to a device for controlling the flow of fluid in a passage such as may be used in the exhaust system of an internal combustion engine or for other purposes.

Valves which have been used in the past to control a fluid flowing through a passage have been found objectionable whenever used with a condensable fluid. The fluid as it flows through the passage tends to condense upon the passage walls and about the valve. This condensate will collect in any recessed portion of the passage or valve and so tends to collect about the valve shaft journalled in the passage. The corrosive effect of the condensate upon the journalled members soon results in seizure of the shaft. This not only eliminates the usefulness of the valve but may also cause considerable harm when the valve is frozen in the closed position.

This invention contemplates the construction of a device which will control the flow of fluid in a passage and avoid the corrosive effects of condensable fluids. It is intended to provide means for preventing the leakage of the fluid and the condensate from the passage in which it flows and to divert or drain away any escaping condensate from the journalled members of the valve, thereby insuring an efficient fluid flow control device for more dependable and serviceable operation.

In the drawings:

Figure 1 shows an internal combustion engine having an exhaust system with a fluid flow control device embracing the principles of this invention.

Figure 2 is a partially cross-sectioned view of the proposed device taken substantially in the plane of lines 2—2 on Figure 1 and looking in the direction of the arrows thereon.

Figure 3 is a cross-sectioned view of the proposed device taken substantially in the plane of line 3—3 on Figure 2 looking in the direction of the arrows thereon.

Figure 4 is an end view of the proposed device as shown in Figure 2 and showing suitable control means.

In the drawings there is shown an internal combustion engine 10 having an exhaust system including an exhaust manifold 12 and an exhaust pipe 14 through which exhaust gases from the engine will normally flow. The proposed device 16 is adapted to be mounted between the exhaust manifold 12 and the exhaust pipe 14 where it may variably obstruct and divert the flow of exhaust gases for use in heating an intake manifold or for other similar purposes. Device 16 is so mounted in the exhaust system as to be inclined from the horizontal in a direction downwardly and away from as well as downwardly and to the rear of the internal combustion engine 10.

Figure 2 shows the device 16 comprising a plate member 18 having a conduit 20 forming a fluid flow passage 22 therethrough. Aligned openings 24 and 26 extend through the conduit 20 at opposite sides of and substantially transverse to the fluid flow passage 22. The opening 24 is closed at its outer end by a plug 28 or other suitable means. Journal bearing or bushing members 30 and 32 are disposed within the outer ends of openings 24 and 26 apart from the flow passage 22 where the housing structure is cooler and where they will more readily dissipate the heat to provide cooler journal bearing means. A valve shaft 34 is rotatably mounted within the openings 24 and 26 and through the bushings 30 and 32. The valve shaft 34 extends from the plug 28 through the fluid flow passage 22 and beyond the bushing 32. The walls of the openings 24 and 26 and the valve shaft 34 extending through the openings form the walls of annular spaces 36 and 38 about the valve shaft.

A valve plate 40 is secured to the valve shaft 34 in the fluid flow passage 22. While the valve plate may be secured to the valve shaft by various means in the present instance the valve plate 40 has two slits 42 and 44 cut into the valve plate 40 and the material adjacent these slits formed to provide grooves 46 and 48 journalled about opposite sides of the valve shaft 34 extending therethrough. Means such as the embossed stiffener 50 may also be used to provide rigidity to the valve plate 40. A collar 52 is secured to the valve shaft 34 within the fluid flow passage 22 between the valve plate 40 and the inner end of the opening 26. This collar 52 bears against a shoulder 54 in the conduit 20 about the inner end of the annular space 38 and substantially seals off the annular space from the fluid flow passage 22.

Substantially all fluid and fluid condensate in the passage 22 will be restricted to the passage due to the sealing of the opening 24 by the plug 28 and of the other opening 26 by the collar 52. Any fluid or fluid condensate in the passage 22 which may by-pass the collar 52 into the annular space 38 will be diverted through a downwardly sloping aperture 56 extending from the annular space 38 to the atmosphere.

Any suitable control means may be secured to the valve shaft 34. In this instance a balance arm 70 with a compensating weight 72 is secured to the end of shaft 34 beyond the opening 26. A bimetal spring 76 is secured to the valve shaft 34 in a notch 74 at the outer end of the valve shaft. A post 78 is mounted in the plate member 18 near and parallel to the valve shaft 34. This post 78 acts as a stop for the balance arm 70 and the bimetal spring 76.

When the engine 10 is cold the bimetal spring 76 positions the valve plate 40 substantially transversely to the passage 22. As the engine warms up heat from the exhaust gases is dissipated in the passage 22 and will be conducted through the valve plate 40 and the valve shaft 34 to the bimetal spring 76. This heat will cause the bimetal spring 76 to contract and, with the cooperation of the compensating weight 72 on the balance arm 70, to position the valve plate 40 attached to the valve shaft 34 in substantially a vertical position. This position provides the least resistance to fluid flow in the passage 22.

Device 16 may be secured between the exhaust manifold 12 and the exhaust pipe 14 by bolts 58 and 60 extending through holes 62 and 64 in the plate member 18 or some other suitable means.

The pressure of the fluid flowing in the passage 22 leaking past the bushing 30 into the space 68 between the plug 28 and the end 66 of the valve shaft 34 causes a pressure on the end of the valve shaft. This pressure on the valve shaft 34 and the gravitational effect on the shaft due to the inclined mounting of the device 16 will further cause the collar 52 on the valve shaft 34 to bear against the shoulder 54 and even more substantially seal off the annular space 38 from the passage 22. The inclined position of the device 16 is such that any condensate from the fluid flowing in the passage 22 that may form or collect about the opening 24 will flow back into the passage 22 and any condensate that may form or collect about the other opening 26 will be sealed off therefrom by the collar 52 bearing against the shoulder 54. Any condensate which does by-pass the collar 52 into the annular space 38 will be drained from this space through the aperture 56 positioned at the lowest part of the annular space 38 to take advantage of the inclined mounting.

What we claim is:

1. In a fluid flow control valve comprising a housing having a fluid flow passage formed therethrough and valve means disposed within said passage and including valve controlling shaft means journaled within opposite side walls of said passage, passage means formed within said housing about the ends of said shaft means and extending from the journaled ends thereof in open communication with said flow passage, atmospheric vent means formed through said housing and intersecting one of said passage means near the outer end thereof, and means for installing said housing within a fluid flow system with said passage means inclined from the horizontal and said one passage means lower than the other thereof for draining fluid condensate away from said one passage means through said vent means and away from said other passage means into said fluid flow passage.

2. In a fluid flow control valve as provided for by claim 1, valve shaft bearing means disposed within the outer ends of said passage means and removed from said fluid flow passage, said vent means being disposed immediately preceding said bearing means within said one passage means for minimizing the accumulation of fluid condensate thereabout and permitting the drainage of condensate away therefrom.

3. In a fluid flow control valve as provided for by claim 1, closure means secured to said shaft means within said flow passage and adjacent the inner end of said one passage means, said closure means bearing against the wall of said flow passage about the inner end of said one passage means for preventing excessive condensate from entering therein upon the installation of said housing with said passage and shaft means inclined from the horizontal.

References Cited in the file of this patent

UNITED STATES PATENTS

| | | |
|---|---|---|
| 940,182 | Morgan | Nov. 16, 1909 |
| 1,533,469 | Schmidt | Apr. 14, 1925 |
| 1,672,603 | Dean | June 5, 1928 |
| 1,781,467 | Madsen | Nov. 11, 1930 |
| 1,877,634 | Anderson | Sept. 13, 1932 |
| 1,888,359 | Ritchie | Nov. 22, 1932 |
| 2,196,503 | McFee | Apr. 9, 1940 |
| 2,266,421 | Griffith | Dec. 16, 1941 |
| 2,564,112 | Kittler | Aug. 14, 1951 |